US 8,804,557 B2

(12) United States Patent
Park et al.

(10) Patent No.: US 8,804,557 B2
(45) Date of Patent: Aug. 12, 2014

(54) APPARATUS AND METHOD FOR TRANSMITTING/RECEIVING DATA IN COMMUNICATION SYSTEM

(75) Inventors: Jaewoo Park, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 13/336,847

(22) Filed: Dec. 23, 2011

(65) Prior Publication Data
US 2012/0163220 A1 Jun. 28, 2012

(30) Foreign Application Priority Data

Dec. 23, 2010 (KR) .................. 10-2010-0133976
Dec. 22, 2011 (KR) .................. 10-2011-0140078

(51) Int. Cl.
*H04L 1/00* (2006.01)
(52) U.S. Cl.
USPC ........................................... 370/252
(58) Field of Classification Search
CPC ............ H04W 24/00; H04W 72/085; H04W 52/0245; H04W 80/04; H04L 43/50; H04L 43/082

USPC ........ 370/252, 253, 254, 468, 329, 328, 338, 370/341, 395.21, 395.41, 395.4
See application file for complete search history.

(56) References Cited

U.S. PATENT DOCUMENTS

| 7,383,039 | B2 * | 6/2008 | Nakamura et al. | ............. 455/419 |
| 7,818,014 | B2 * | 10/2010 | Takizawa et al. | ............. 455/453 |
| 8,150,408 | B2 * | 4/2012 | Rezaiifar et al. | ............. 455/452.2 |
| 2005/0157676 | A1 | 7/2005 | Kwak et al. | |

* cited by examiner

Primary Examiner — Chi Pham
Assistant Examiner — Alexander O Boakye

(57) ABSTRACT

An apparatus for transmitting data in a communication system includes: a receiver configured to receive signals from a plurality of terminals in a multiuser-multi-input multi-output (MU-MIMO) scheme; an assignor configured to assign group IDs to terminal groups, respectively after identifying the plurality of terminals and grouping the plurality of terminals into the terminal groups; a generator configured to define a load element which indicates a resource and load state of a basic service set (BSS) through the group IDs and to generate a beacon frame including the load element; and a transmitter configured to transmit the beacon frame to the plurality of terminals in the MU-MIMO scheme.

10 Claims, 3 Drawing Sheets

FIG. 2

| 210 | 220 | 230 | 240 |
|---|---|---|---|
| Element ID<br>1 octec | Length<br>1 octec | Group ID Usage<br>1 octec | Spatial Stream Usage<br>8 octec |

FIG. 3

| 380 | 370 | 360 | 350 | 340 | 330 | 320 | 310 |
|---|---|---|---|---|---|---|---|
| Spatial Stream #8 | Spatial Stream #7 | Spatial Stream #6 | Spatial Stream #5 | Spatial Stream #4 | Spatial Stream #3 | Spatial Stream #2 | Spatial Stream #1 |

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2010-0133976 and 10-2011-0140078, filed on Dec. 23, 2010, and Dec. 22, 2011, respectively, which are incorporated herein by reference in their entirety.

BACKGROUND OF THE INVENTION

1. Field of the Invention

Exemplary embodiments of the present invention relate to a communication system, and, more particularly, to an apparatus and a method which can regularly transmit and receive data by informing a terminal for example, a station (hereinafter, referred to as 'STA') about a resource and load state of a basic service set (hereinafter, referred to as 'BSS') in a communication system which provides a service through a multi-input multi-out (hereinafter, referred to as 'MIMO') scheme to multi-user.

2. Description of Related Art

In a current communication system, research for providing services having various quality of service (hereinafter, referred to as 'QoS') to users at a high transmission speed has been actively conducted. In a wireless lacal area network (hereinafter, referred to as 'WLAN') system as an example of such a communication system, research for providing a method for transmitting stably and at a high speed large-capacity data through a limited resource has actively been conducted. In particular, in a communication system, research for transmitting data through a wireless channel has actively been conducted, and recently, methods for allowing a WLN system to regularly transmit and receive large-capacity data using effectively limited wireless channels have been proposed.

Meanwhile, in a recent communication system, a method for transmitting and receiving large-capacity data to and from plural terminals for example, STAs through plural base stations for example, access points (hereinafter, referred to as 'AP') has been proposed. Here, the STAs are able to connect with all APs, and thus, the STAs select an arbitrary one of the APs to be wireless connected to the selected AP, such that the STAs transmit and receive large-capacity data through a wireless channel to and from the selected AP.

However, as described above, since the STAs arbitrarily select one AP and connect with it, there may be an AP on which connections of the STAs are concentrated. That is, since although the STAs which are connected to the ATs are uniformly distributed among all the APs, the STAs may concentrately be connected to a particular AP, a problem may occur that the traffic is not uniformly distributed among the APs, but concentrated on the particular AP. As traffic is concentrated on a particular AP, there is a limit of transmitting and receiving large-capacity dat between plural APs and plural STAs, and in particular, there is a problem that the particular AP on which traffic is concentrated does not normally transmit and receive data to and from the connected STAs.

Therefore, in a communication system, for example, a WLAN system, a method for transmitting and receiving at a high speed and stably large-capacity data through plural APs from and to plural STAs in limited resource is demanded, and in particular, a method for normally transmitting and receiving data large-capacity multimedia data to and from the connected STAs by suitably distributing the traffic among the plural APs is demanded in the art.

SUMMARY OF THE INVENTION

Embodiments of the present invention are directed to an apparatus and a method for transmitting and receiving data in a communication system.

Other embodiments of the present invention are directed to an apparatus and a method for transmitting and receiving at a high speed and normally large-capacity data to and from the STAs connected to plural APs in limited resource in a communication system which provides a service to multi-user in a MIMO way.

Other embodiments of the present invention are directed to an apparatus and a method for normally transmitting and receiving data between plural STAs and plural APs by suitably distributing traffic of the STAs and the APs in a communication system which provides a service to multi-user in a MIMO scheme.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a receiver configured to receive signals from a plurality of terminals in a multiuser-multi-input multi-output (MU-MIMO) scheme; an assignor configured to assign group IDs to terminal groups, respectively after identifying the plurality of terminals and grouping the plurality of terminals into the terminal groups; a generator configured to define a load element which indicates a resource and load state of a basic service set (BSS) through the group IDs and to generate a beacon frame including the load element; and a transmitter configured to transmit the beacon frame to the plurality of terminals in the MU-MIMO scheme.

In accordance with another embodiment of the present invention, a method for transmitting data in a communication system includes: receiving signals from a plurality of terminals in a multiuser-multi-input multi-output (MU-MIMO) scheme; assigning group IDs to terminal groups, respectively after identifying the plurality of terminals and grouping the plurality of terminals into the terminal groups; defining a load element which indicates a resource and load state of a basic service set (BSS) through the group IDs, and generating a beacon frame including the load element; and transmitting the beacon frame to the plurality of terminals in the MU-MIMO scheme.

BRIEF DESCRIPTION OF THE DRAWINGS

FIGS. 2 and 3 are views schematically illustrating structures of a data packet in a communication system in accordance with another embodiment of the present invention.

DESCRIPTION OF SPECIFIC EMBODIMENTS

Figure 1:
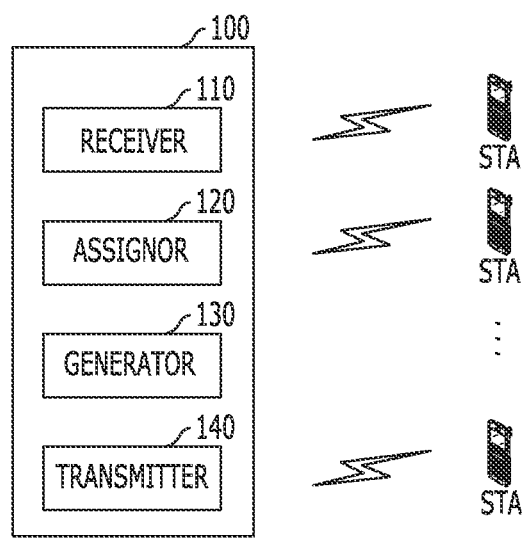
FIG. 1 is a block diagram schematically illustrating a configuration of an AP in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and a method for transmitting and receiving data in a communication system, for example, a wireless local area network (hereinafter, referred to as 'WLAN') system. Although the WLAN system will be exemplarily described in the embodiments of the present invention, it is to be noted that the data transmission and reception scheme as proposed by the present invention may be applied to other communication systems.

In embodiments of the present invention, there are proposed an apparatus and a method for normally transmitting and receiving large-capacity data through plural base stations for example, access points (hereinafter, referred to as 'AP') to and from plural terminals for example, stations (hereinafter, referred to as 'STA') in a communication system which provides a service to multi-user in a multi-input multi-output (hereinafter, referred to as 'MIMO') scheme. In a communication system which supports a multi-user and MIMO for example, a WLAN system according to an embodiment of the present invention, by informing STAs about a resource and load state of a basic service set (hereinafter, referred to as 'BSS') which is defined by an AP, the STAs can connect with the most suitable AP, such that connections of the STAs to the APs are suitably distributed, that is the traffic of the APs equally distributed to transmit and receive at a high speed and normally large-capacity data between the APs and the STAs.

That is, in a WLAN system according to an embodiment of the present invention, in order to allow APs and SATs that support a multiuser-MIMO scheme to transmit and receive normally large-capacity between the APs and the STAs, a load element which indicates a resource and load state of a BSS is transmitted to the STAs, and the STAs identify the load element and connect with an optimal AP among the APs, such that traffic of the APs and the STAs connected to each AP are equally distributed and the APs and the STAs normally transmit and receive large-capacity data to and from one another. Here, in a WLAN system according to an embodiment of the present invention, the load element which is a resource and load state of a BSS is defined by a group ID or use and occupancy levels of each frequency bandwidth.

Meanwhile, in a WLAN system according to an embodiment of the present invention, by using a group ID corresponding to one STA group of the predetermined number of STAs, a load element which indicates the resource and load state of the BSS, that is, resource and load states of each AP, is defined. Here, one group ID is assigned to one STA group, and at this time, since the one STA group has the predetermined number of STAs, the more there are group IDs in an arbitrary AP, that is a BSS, the more number of STAs increases, such that the resource and load state of the BSS, that is, each resource and load state of APs, is poor.

Further, in a WLAN system according to an embodiment of the present invention, use and occupancy levels of each frequency bandwidth in all frequency bandwidth which is available in the BSS are calculated, respectively, and the load element which indicates the resource and load state of the BSS, that is resource and load states of each AP is defined according to the use and occupancy levels. Here, signal strengths of each frequency bandwidth are measured, and the use and occupancy levels of each frequency bandwidth are determined corresponding to the measured signal strengths. Thus, since the more number of signals transmitted and received through each frequency bandwidth there are, the greater strengths the measured signals have, such that the use and occupancy levels of each frequency bandwidth are increased, the resource and load state of the BSS, that is each resource and load state of APs is poor.

In such a WLAN system according to an embodiment of the present invention, the load element which indicates the resource and load state of the BSS, that is each resource and load state of APs is defined through the group ID or the use and occupancy levels of each frequency bandwidth, and by transmitting a data packet, for example a beacon frame including the defined load element to STAs, it is possible to inform the STAs about the resource and load state of the BSS. And, by identifying the load element included in the beacon frame, the STAs recognize the resource and load state of the BSS, that is each resource and load state of APs, such that the STAs connect with the most suitable AP of which the resource and load state is the most excellent to transmit and receive normally large-capacity data. Therefore, in a WLAN system according to an embodiment of the present invention, traffic of each AP and the STAs connected to each AP are fairly distributed. In such a WLAN system according to an embodiment of the present invention, by fairly distributing traffic of each AP and the STAs connected to each AP, the APs and the STAs normally transmit and receive large-capacity data. Hereinafter, an AP in a communication system in accordance with an embodiment of the present invention will be described in detail with reference to FIG. 1.

FIG. 1 is a block diagram schematically illustrating a structure of an AP in a communication system in accordance with an embodiment of the present invention.

Referring to FIG. 1, the AP includes a receiver 110 for receiving data from the plurality of STAs which support an MU-MIMO scheme, an assignor 120 for assigning group IDs to terminal groups, respectively after identifying and grouping the plurality of STAs, a generator 130 for, after defining a resource and load state of the AP, that is a load element which indicates a resource and load state of the BSS, generating a data packet including the load element, and a transmitter 140 for transmitting the data packet to the plurality of STAs.

The receiver 110 receives data from the plurality of STAs through an available frequency bandwidth of the AP and measures strengths of signals received through each frequency bandwidth in the available frequency bandwidth. And, the receiver 110 calculates use and occupancy levels of each frequency bandwidth of the available frequency bandwidth based on the measured signal strengths.

As described above, after identifying all of the plurality of STAs in the BSS, the assignor 120 groups the identified STAs into STA groups by the predetermined number and assigns group IDs to the STA groups, respectively.

The generator 130 defines the resource and load state of the BSS, that is, the AP, and generates the data packet including the defined load element, that is, the beacon frame. The transmitter 140 transmits the data packet including the data packet including the defined load element, that is, the beacon frame, to inform the plurality of SATs about the resource and load state of the BSS, that is, resource and load states of each AP.

Here, although the structures of STAs are not depicted in the concrete, the STAs receive a data packet transmitted from the AP through a receiver, make sure of the resource and load state of the BSS, that is the resource and load states of each AP by identifying the load element included in the data packet through an identifier, and connect with one among the plurality of APs which is in the most excellent and suitable resource and load state through a transmitter considering the resource and load state of the BSS. And, as the AP and the STA are support the MU-MIMO scheme, the AP and the STA transmit and receive at high speed and normally large-capacity data through a wireless channel in the MU-MIMO scheme. Then, referring to FIGS. 2 and 3, the data packet will be described in detail, which includes the load element which is transmitted for informing the STAs about the resource and load state of the BSS, that is the resource and load states of each AP in the communication system according to an embodiment of the present invention.

FIGS. 2 and 3 are views schematically illustrating structures of data packets in a communication system in accordance with an embodiment of the present invention. Here, as described above, FIG. 2 is a view schematically illustrating the structure of the data packet, that is the beacon frame including the load element defined according to the group ID or the use and occupancy level, and FIG. 3 is a view schematically illustrating a structure of spatial stream usage of the data packet depicted in FIG. 2.

First, referring to FIG. 2, the data packet includes an element ID field 210 which indicates the load element in a WLAN system of supporting the MU-MIMO scheme, a length field 220 which indicates a length of a field in which the load element is included, a group ID usage field 230 which indicates that the load element is defined according to a group ID, and a spatial stream usage field 240 which indicates that the load element is defined according to use and occupancy levels of each frequency bandwidth.

Here, the group ID usage field 230 includes information about the number of the group IDs assigned to the STA groups or the number of the group IDs unassigned among all group IDs in each BSS previously defined.

The spatial stream usage field 240 includes information about a use and occupancy level of a spatial stream corresponding to each frequency bandwidth in the full stream corresponding to an available frequency bandwidth in a BSS. That is, the information about a resource state of the BSS is included in the spatial stream usage field 240. Further, the spatial stream usage field 240 may include information about the use and occupancy level by indicating the number of the spatial streams used by each group ID included in the group ID usage field 230. And then, the spatial stream usage field 240 will be described more in detail with reference to FIG. 3.

Referring to FIG. 3, the spatial stream usage field 240 includes fields 310 to 380 which indicate the numbers of each spatial stream. As described above, each of the spatial stream number fields 310 to 380 includes information about the numbers of the spatial streams used by each group ID included in the group ID usage field 230.

Further, each of the spatial stream number fields 310 to 380 includes information about the numbers of spatial streams used in each frequency bandwidth, such that they include information about the use and occupancy levels of each frequency bandwidth.

Such a WLAN system according to an embodiment of the present invention informs the STAs about the resource and load state of the BSS, that is the resource and load states of each AP by transmitting to the STAs the data packet which includes the load element defined according to the group ID through the group ID usage field 230 or the use and occupancy levels of each frequency bandwidth through the spatial stream usage field 240. And, as mentioned above, the STAs identify the resource and load state of the BSS, that is each resource and load of APs by identifying the load element, and connect with the most suitable AP which is best in the resource and load state of the BSS. Thus, traffic of each AP and the STAs which are connected to the APs are equally distributed, such that the APs and the STAs normally transmit and receive large-capacity data. Hereinafter, operations of an AP in a communication system according to an embodiment of the present invention will be described in detail with reference to FIG. 4.

Figure 4:
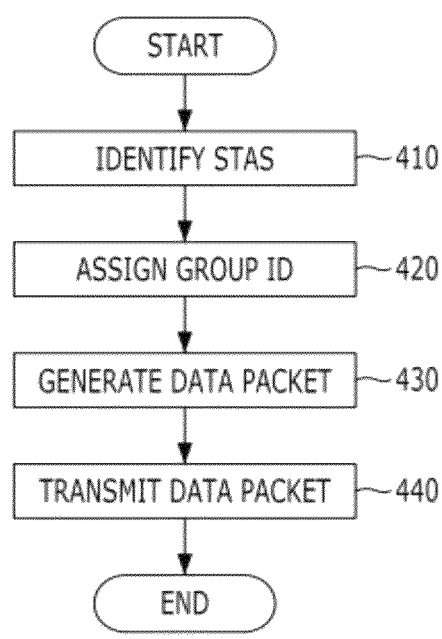
FIG. 4 is a flowchart schematically explaining operations of an AP in a communication system in accordance with still another embodiment of the present invention.

FIG. 4 is a flowchart schematically explaining operations of an AP in a communication system in accordance with still another embodiment of the present invention.

Referring to FIG. 4, at step 410, the AP supports an MU-MIMO scheme and identifies STAs of transmitting data. The AP measures strengths of signals transmitted through an available frequency bandwidth by it from the STAs and calculates use and occupancy levels of each frequency bandwidth considering the measured strengths.

Then, at step 420, after grouping the identified STAs, the AP assigns group IDs to STA groups. Since the assignment of the group IDs has been concretely explained above, detailed explanation thereof will be omitted herein.

Then, at step 430, a load element which indicates the resource and load state of the BSS, that is each resource and load state of APs is defined through the user and occupancy levels and the group IDs, and a data packet, that is, a beacon frame including the load element is generated.

Then, at step 440, the AP transmits the beacon frame including the load element to inform the STAs about the resource and load state of the BSS, that is each resource and load state of APs, and the STAs connect with the most suitable AP which is best in the resource and load state of the BSS. Thus, the traffic of each AP and the STAs connected to each AP are fairly distributed, such that the APs and the STAs normally transmit and receive large-capacity data.

As is apparent from the above descriptions, in the embodiments of the present invention, it is possible to transmit and receive at a high speed and normally large-capacity data between plural STAs and plural APs by suitably distributing traffic of the STAs and the APs in a communication system which provides a service to multi-user in a MIMO scheme.

Furthermore, in the embodiments of the present invention, it is possible to transmit and receive at a high speed and normally large-capacity data between plural STAs and plural APs by informing STAs about the resource and load state of BSS and allowing STAs to connect with the most suitable one among the APs.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, the apparatus comprising:
    a receiver configured to receive signals from a plurality of terminals in a multiuser-multi-input multi-output (MU-MIMO) scheme;
    an assignor configured to assign group IDs to terminal groups, respectively, after identifying the plurality of terminals and grouping the plurality of terminals into the terminal groups;
    a generator configured to define a load element which indicates a resource and load state of a basic service set (BSS) and to generate a beacon frame including the load element; and
    a transmitter configured to transmit the beacon frame to the plurality of terminals in the MU-MIMO scheme, wherein the receiver measures strengths of the signals received through available frequency bandwidths from the plurality of terminals and calculates use and occupancy levels of each frequency bandwidth of the available frequency bandwidths based on the measured signal strengths, and wherein the load element is defined using any one of the group IDs and the use and occupancy levels.

2. The apparatus of claim 1, wherein a load element which is defined using the group IDs is included in a group ID usage field of the beacon frame, and a load element which is defined using the use and occupancy levels is included in a spatial stream usage field of the beacon frame.

3. The apparatus of claim 2, wherein the spatial stream usage field of the beacon frame includes information indicating a number of spatial streams which is used in a full stream of the available frequency bandwidths by the group IDs.

4. The apparatus of claim 2, wherein the spatial stream usage field of the beacon frame includes information indicating use and occupancy levels of spatial streams corresponding to each frequency bandwidth in a full stream of the available frequency bandwidths.

5. The apparatus of claim 1, wherein the plurality of terminals identify the load element included in the beacon frame to identify the resource and load state of the basic service set for a plurality of access points, and connect with an access point which is best among the plurality of access points in the resource and load state of the basic service set.

6. A method for transmitting data in a communication system, the method comprising:
receiving signals from a plurality of terminals in a multiuser-multi-input multi-output (MU-MIMO) scheme;
assigning group IDs to terminal groups, respectively, after identifying the plurality of terminals and grouping the plurality of terminals into the terminal groups;
defining a load element which indicates a resource and load state of a basic service set (BSS), and generating a beacon frame including the load element; and
transmitting the beacon frame to the plurality of terminals in the MU-MIMO scheme,
wherein said receiving the signals from the plurality of terminals comprises:
measuring strengths of the signals received through available frequency bandwidths from the plurality of terminals; and
calculating use and occupancy levels of each frequency bandwidth of the available frequency bandwidths based on the measured signal strengths, and
wherein the load element is defined using any one of the group IDs and the use and occupancy levels.

7. The method of claim 6, wherein a load element which is defined using the group IDs is included in a group ID usage field of the beacon frame, and a load element which is defined using the use and occupancy levels is included in a spatial stream usage field of the beacon frame.

8. The method of claim 7, wherein the spatial stream usage field of the beacon frame includes information indicating a number of spatial streams which the group IDs use in a full stream of the available frequency bandwidths.

9. The method of claim 7, wherein the spatial stream usage field of the beacon frame includes information indicating use and occupancy levels of spatial streams corresponding to each frequency bandwidth in a full stream of the available frequency bandwidths.

10. The method of claim 6, further comprising:
allowing the plurality of terminals to identify the load element included in the beacon frame to identify the resource and load state of the basic service set for a plurality of access points; and
allowing the plurality of terminals to connect with an access point which is best among the plurality of access points in the resource and load state of the basic service set.

* * * * *